Patented Jan. 9, 1951

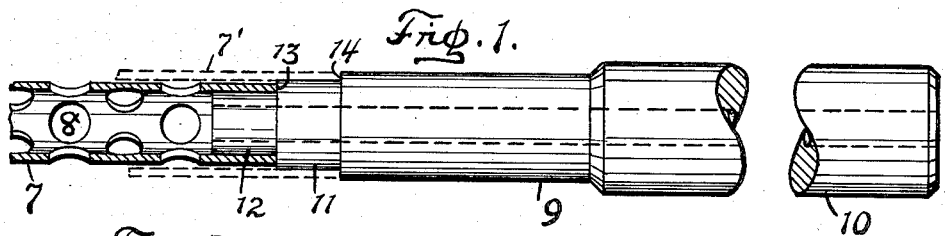
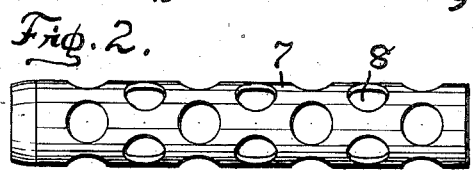
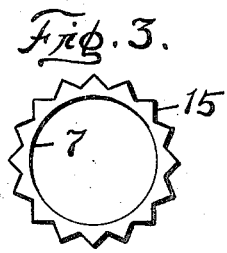
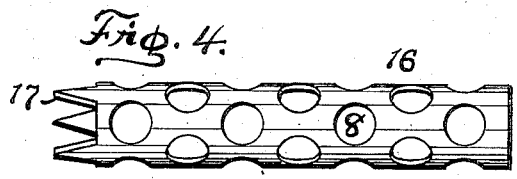
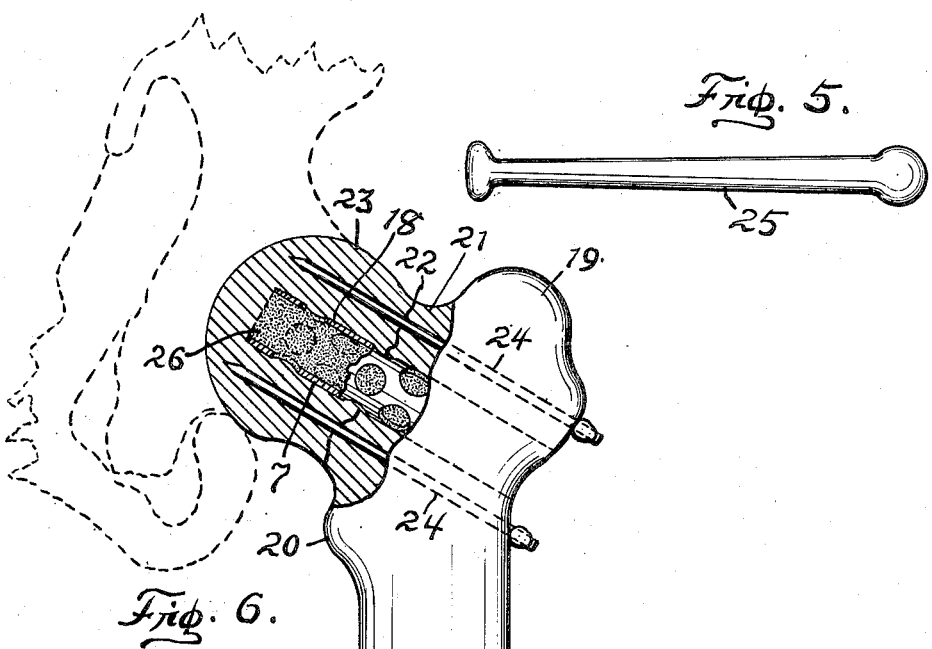

2,537,070

UNITED STATES PATENT OFFICE 2,537,070

SURGICAL APPLIANCE AND METHOD FOR FIXATION OF BONE FRAGMENTS

Earl E. Longfellow, Warsaw, Ind., assignor, by mesne assignments, to De Puy Manufacturing Company, Inc., Warsaw, Ind., a corporation of Indiana Application December 27, 1948, Serial No. 67,412

2 Claims. (Cl. 128—92)

This invention relates to improvements in a surgical appliance and method for fixation of the fragments of a fracture through the neck of a femur bone.

Various methods and devices have been resorted to for uniting bone fragments of a fractured femur, consisting generally of screws or winged nails that are driven through the neck of the femur into the spherical head, which temporarily remain in place until the fragments of the fractured member are naturally united by the formation of callous about the fracture line, after which the screws are allowed to remain in place or subsequently are removed leaving the calloused bone fracture to support the adjacent portion of the patient's body.

The instant invention has for an object the provision of a permanent reenforce for adjusted bone fragments in a case of fracture of the neck of a femur bone, and also, in conjunction therewith, an investment of material constituting a secondary reenforce.

Another object of the invention is the provision of a permanent reenforcement that is easily applicable to a femur bone that is fractured in the neck between the trochanters and the spherical head which is seated in the pelvis.

And a further object of the invention is to provide a permanent tubular reenforce for fragments of a fractured bone after having been readjusted in place and to supplement the reenforce with an added supporting agent.

Other objects and advantages of the invention appear in the following description.

An illustrative embodiment of the invention is shown in the accompanying drawings in which:

Fig. 1 is a fragmentary side elevational view of a reenforce and an applicator in which the invention is incorporated;

Fig. 2 is a side elevational view of a reenforce of preferred form;

Fig. 3 is an end elevation, drawn upon an enlarged scale, of a modified form of the tube for making the reenforce;

Fig. 4 is a side elevational view of another modification of the reenforce;

Fig. 5 is a side elevational view of a ram used in applying the secondary reenforce; and Fig. 6 is a schematic fragmentary elevational view of a fractured bone to which the invention is applied, a portion being shown in section.

The illustrative embodiment of the invention consists of a reenforce, an instrument for driving the reenforce in place after the fractured bone has been drilled in preparation for its reception, and a secondary reenforce.

The reenforce is in the form of a tube 7, preferably made of stainless steel, one end of which is tapered inwardly by reducing its external peripheral wall to facilitate driving of the tube into place in an orifice made in the fractured bone for its reception. The wall of the tube has made therein numerous apertures 8 located more or less uniformly spaced apart throughout its length for the purpose hereinafter referred to.

The driving instrument consists of a shaft 9 having a handle 10 on one end thereof, and upon its opposite end extensions 11 and 12 of different diameters that fit in the proximal ends of the reenforces 7—7' of correspondingly different internal diameters, there being shoulders 13—14 on the instrument adjacent said extensions aginst which the proximal ends of said reenforces respectively abut.

If so desired the tube that forms the reenforce may be provided with longitudinal serrations 15 on its external peripheral wall, as shown in Fig. 3, that tend to prevent rotation of the reenforce in the orifice made in the bone fragments, or relative rotation of one of said fragments relative to the other.

In Fig. 4 is shown a reenforce 16, similar to that shown in Fig. 2, provided with apertures 8. The distal end of this form of reenforce has a series of prongs 17 that enter the structure of one of the bone fragments when the reenforce is driven into place and serves to prevent rotation of said fragment relative thereto.

Operation

In applying the invention, an orifice 18 is drilled from between the trochanters 19—20 axially through the neck 21 of the femur, past the fractured line 22 into the spherical femur head 23 for the reception of the reenforce 7, and if so desired, the bone fragments are further drilled for reception of anchor pins 24 by which to prevent relative rotation of the fragments. The reenforce 7 is then positioned on the proper extension 11 or 12 on the driving instrument, by which the reenforce is inserted into the orifice 18 past the fracture line 22, after which the instrument is withdrawn leaving the reenforce in place. Subsequently, the tube is filled with a pulverized bone substance by tamping with a ram 25 (Fig. 5), thus forming the secondary reenforcing agent 26 into a compact mass in the tube, which is an important feature of the invention.

The powdered bone when packed into the tube impinges through the apertures 8 against the wall of the drilled orifice and eventually solidifies and unites with the wall by natural process of solidification aided by absorption of moisture from the bone structure. In this manner is established in the fractured bone both a metallic reenforce and a secondary reenforce that is united with the original bone structure through the apertures in the metallic reenforce, thus establishing a solid and permanent union between the fragments of the fractured bone.

Variations from the particular construction above disclosed may be resorted to by the exercise of skill in the art, without departure from the spirit or scope of the invention.

What I claim is:

1. The method of supporting fragments of a fractured bone, said method consisting of drilling an orifice into said fragments, inserting in said orifice a metal tube having apertures in its wall, and subsequently packing said tube with a powdered bone substance to form a secondary reenforce, said substance being impinged through said apertures against the wall of said orifice.

2. In a bone fracture appliance, a metallic tube having numerous apertures in its wall, constituting a primary reenforce adapted to be inserted in an orifice made in said bone for its reception, and a powdered bone substance inserted into the tube and impinging through said apertures against the wall of said orifice, constituting a secondary reenforce.

EARL E. LONGFELLOW.

REFERENCES CITED

The following references are of record in the file of this patent:

UNITED STATES PATENTS

| Number | Name | Date |
|---|---|---|
| 2,239,088 | Ettinger | Apr. 22, 1941 |

OTHER REFERENCES

Annals of Surgery, for 1893, page 135. (Copy in Div. 55.)

Surgery, Gynecology & Obstetrics, for 1934, page 195. (Copy in Div. 55.)

Der Chirurgie, for 1936, page 804. (Copy in Div. 55.)

Bickham's Operative Surgery, vol. 2, published by W. B. Saunders of Philadelphia, Pa. in 1924, page 312.